United States Patent
Bell et al.

(10) Patent No.: US 6,720,396 B2
(45) Date of Patent: Apr. 13, 2004

(54) POLYMERIZATION PROCESS

(75) Inventors: Susan L. Bell, League City, TX (US); Abdul Gaffar Vadagama, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/726,712

(22) Filed: Nov. 30, 2000

(65) Prior Publication Data
US 2002/0065376 A1 May 30, 2002

(51) Int. Cl.$^7$ ............. C08F 4/44; C08F 4/642; C08F 2/06
(52) U.S. Cl. .......... 526/160; 526/70; 526/124.3; 526/129; 526/352; 526/907; 526/90
(58) Field of Search ............... 526/70, 124.3, 526/160, 129, 907, 352

(56) References Cited

U.S. PATENT DOCUMENTS

| | | | |
|---|---|---|---|
| 4,100,105 A | | 7/1978 | Levine et al. ............. 252/429 |
| 4,167,493 A | | 9/1979 | Hsieh ....................... 252/429 |
| 4,196,097 A | | 4/1980 | Ligorati et al. ........... 252/429 |
| 4,263,169 A | | 4/1981 | Scata et al. ............... 252/429 |
| 5,698,487 A | * | 12/1997 | Sacchetti et al. .......... 502/117 |
| 5,759,940 A | * | 6/1998 | Sacchetti et al. .......... 502/134 |
| 5,798,314 A | | 8/1998 | Spencer et al. ............ 502/115 |
| 6,066,588 A | * | 5/2000 | Razavi et al. ............. 502/117 |
| 6,136,742 A | | 10/2000 | Chang ...................... 502/108 |
| 6,136,747 A | * | 10/2000 | Kao et al. ................. 502/158 |
| 6,262,191 B1 | * | 7/2001 | Hottovy et al. ............ 526/64 |

FOREIGN PATENT DOCUMENTS

| | | | |
|---|---|---|---|
| EP | | 0416815 A2 | 3/1991 |
| EP | | 416 815 A2 | * 3/1991 |
| EP | | 0506074 A2 | 9/1992 |
| EP | | 0633272 A1 | 1/1995 |
| EP | | 0669346 A | 8/1995 |
| EP | | 0811638 A | 12/1997 |
| EP | | 0819706 A1 | 1/1998 |
| EP | | 0856525 A1 | 8/1998 |
| WO | | WO 96/01856 | 1/1996 |
| WO | | WO 96/13530 | 5/1996 |
| WO | | WO 98/13393 | 4/1998 |
| WO | | WO 98/21248 | 5/1998 |
| WO | | WO 99/61486 | * 12/1999 |

* cited by examiner

*Primary Examiner*—David W. Wu
*Assistant Examiner*—R. Rabago
(74) *Attorney, Agent, or Firm*—Jaimes Sher; Lisa Kimes Jones; Kevin M. Faulkner

(57) ABSTRACT

The present invention relates to a catalyst composition of an activator, a catalyst compound and a support in a liquid. The catalyst composition of the invention is utilized as prepared, in the liquid, in a process for polymerizing olefin(s), preferably a slurry polymerization process.

14 Claims, No Drawings

POLYMERIZATION PROCESS

FIELD OF THE INVENTION

This invention relates generally to a process for polymerizing olefin(s) in the presence of a catalyst composition prepared in a manner that substantially reduces the time and the cost for making a catalyst composition. Most importantly, the method of making the catalyst composition results in improved process operability, particularly in a slurry process.

BACKGROUND OF THE INVENTION

Supported catalyst systems are widely used in olefin polymerization processes, particularly in a gas phase or a slurry phase. Typically for a supported catalyst, preparation of the catalyst involves dissolving a catalyst in a solvent, dissolving an activator or co-catalyst in a solvent and placing a support in a solution or reaction mixture with the catalyst and activator. Many techniques are known in the art that include adding each of these catalyst components in different orders, solutions, amounts, support materials, other components, etc., however, invariably the final catalyst composition is oftentimes washed in various solvents and/or dried to a solid state.

Examples of conventional supporting techniques are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. Nos. 271,598 filed Jul. 7, 1994, now U.S. Pat. No. 5,468,702, and 788,736 filed Jan. 23, 1997, now U.S. Pat. No. 6,090,740, and PCT publications WO 95/32995, WO 95/14044, WO 96/06187 and WO 97/02297, and EP-B1-0 685 494 all of which are herein fully incorporated by reference.

It is common practice to dry and/or evaporate the solvents in final stage for preparing a supported catalyst system. The drying and/or evaporating step is generally accomplished by elevating the temperature, using a vacuum, purging of inert gas or combinations thereof. The drying procedures generally result in the catalyst and activator being deposited on or in a support material resulting in a dry powder or granule supported catalyst system. It is in this physical form under an inert atmosphere that the supported catalyst system is typically stored and/or shipped for use in a polymerization process. The amount of time necessary for drying a supported catalyst system adds many hours to a catalyst manufacturing plant production schedule and adds a substantial energy cost.

There is much discussion in the literature on forming a supported catalyst system, and in addition re-slurrying the supported catalyst system in various liquids for use in particular a slurry polymerization process.

Thus, there is a need for an improved method for making a useful catalyst composition having improved performance and operability in the polymerization of olefin(s).

SUMMARY OF THE INVENTION

The invention is directed to a polymerization process utilizing a catalyst composition formed in a way that eliminates various steps conventionally used in the formation of a supported catalyst system.

In one embodiment, the invention relates to a process for polymerizing olefin(s) in the presence of a catalyst composition, the catalyst composition comprising a liquid, a catalyst compound, an activator, and a support, wherein the catalyst composition is utilized as is without drying or washing the catalyst composition. In a preferred embodiment, the catalyst composition of the mixture of the liquid, catalyst compound, activator and support is maintained for a period of time prior to introducing the catalyst composition to the polymerization process. In a most preferred embodiment, the polymerization process is a slurry process.

DETAILED DESCRIPTION OF THE INVENTION

Introduction

It has been discovered that a catalyst composition of a liquid, a support, a catalyst compound, and an activator that is maintained as a mixture for a period of time, and subsequently, used, as is, in a polymerization process results in better process operability and improved catalyst productivity in a polymerization process. The reduction, preferably the elimination, of the typical drying step in a conventional supported catalyst manufacturing process results in improved process economics and improved polymerization process, particularly in the slurry phase. These catalyst preparation techniques offer reduced catalyst manufacturing times and lower costs stemming from lower energy costs, lower vacuum costs, pressure reducing costs, lower purge gas costs, storage costs, etc. Furthermore, without being bound to any particular theory, it is believed that supporting a catalyst system often results in the lowering the overall productivity of a particular catalyst. Also, it is believed that the support materials used deactivate some of the active catalyst species, and that a drying or dehydration step also lowers catalyst performance.

The inventive use of the catalyst composition of the invention in a polymerization process, in particular a slurry process, surprisingly results in better process operability and catalyst performance.

Catalyst Compounds

Any type of polymerization catalyst or catalyst system may be used to form the catalyst composition of the invention. Bulky ligand metallocene catalyst compounds and Group 15 containing bidentate or tridentate transition metal catalysts are preferred; however, catalyst compounds or activators that are sufficiently soluble in a liquid are desirable.

Conventional Transition Metal Catalysts

Conventional-type transition metal catalysts are those traditional Ziegler-Natta catalysts and Phillips-type chromium catalyst well known in the art. Examples of conventional-type transition metal catalysts are discussed in U.S. Pat. Nos. 4,115,639, 4,077,904, 4,302,565, 4,302,566, 4,482,687, 4,564,605, 4,721,763, 4,879,359 and 4,960,741 and British Patent Application 2,105,355, all of which are herein fully incorporated by reference. The conventional-type transition metal catalyst compounds that may be used in the present invention include transition metal compounds from Groups III to VIII, preferably IVB to VIB of the Periodic Table of Elements.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium or vanadium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$, and $VOCl_3$, $VCl_4$ and $VOCl_2$—OR where R is a hydrocarbon radical.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethylhexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436, which are all herein incorporated by reference Typically, these conventional-type transition metal catalyst compounds excluding some convention-type chromium catalyst compounds are activated with one or more of the conventional-type cocatalysts described below.

Conventional-type Cocatalysts

Conventional-type cocatalyst compounds for the above conventional-type transition metal catalyst compounds may be represented by the formula $M^3M^4{}_v X^2{}_c R^3{}_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds of Group IA, IIA and IIIA useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group IIA metals, and mono- or di-organohalides and hydrides of Group IIIA metals. Non-limiting examples of such conventional-type cocatalyst compounds include di-isobutylaluminum bromide, isobutylboron dichloride, methyl magnesium chloride, ethylberyllium chloride, ethyl-calcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

Bulky Ligand Metallocene Catalyst Compounds

Generally, bulky ligand metallocene catalyst compounds include half and full sandwich compounds having one or more bulky ligands bonded to at least one metal atom. Typical bulky ligand metallocene catalyst compounds are generally described as containing one or more bulky ligand (s) and one or more leaving group(s) bonded to at least one metal atom. In one preferred embodiment, at least one bulky ligands is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene catalyst compounds of the invention are represented by the formula:

$$L^A L^B M Q_n \tag{I}$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopenta-cyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $\eta^3$-bonding to M and most preferably $\eta^5$-bonding. In yet another embodiment, the atomic molecular weight (MW) of $L^A$ or $L^B$ exceeds 60 a.m.u., preferably greater than 65 a.m.u.. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkylcarbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the bulky ligand metallocene catalyst compounds of the invention include those of formula (I) where $L^A$ and $L^B$ are bridged to each other by at least one bridging group, A, such that the formula is represented by

$$L^A A L^B M Q_n \qquad (II)$$

These bridged compounds represented by formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of formula (II) have two or more bridging groups A (EP 664 301 B1).

In one embodiment, the bulky ligand metallocene catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, bulky ligand metallocene catalysts compounds useful in the invention include bridged heteroatom, mono-bulky ligand metallocene catalyst compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene catalyst compound is represented by the formula:

$$L^C A J M Q_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (III) is as defined above for $L^A$, A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene catalyst compound is represented by the formula:

$$L^D MQ_2(YZ)X_n \quad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379, WO 98/22486 and WO 99/40095 (dicarbamoyl metal complexes) and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, now U.S. Pat. No. 6,103,657, which is herein incorporated by reference. In another embodiment, the bulky ligand metallocene catalyst compounds are those described in PCT publications WO 99/01481 and WO 98/42664, which are fully incorporated herein by reference.

In one embodiment, the bulky ligand metallocene catalyst compound is represented by the formula:

$$((Z)XA_t(YJ))_q MQ_n \quad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur, then Z is optional. In another embodiment, where X is nitrogen or phosphorous, then Z is present. In an embodiment, Z is preferably an aryl group, more preferably a substituted aryl group.

Other Bulky Ligand Catalyst Compounds

It is within the scope of this invention, in one embodiment, that the bulky ligand catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as other bulky ligand catalysts are those diimine based ligands of Group 8 to 10 metal compounds disclosed in PCT publications WO 96/23010, WO 97/48735, U.S. Pat. No. 6,114,483 and Gibson, et. al., Chem. Comm., pp. 849–850 (1998), all of which are herein incorporated by reference. Also included are those cyclic oligomeric oxo- and imido-metal complexes described in U.S. Pat. No. 6,121,181.

Other bulky ligand catalysts are those Group 5 and 6 metal imido complexes described in EP-A2-0 816 384 and U.S. Pat. No. 5,851,945, which is incorporated herein by reference. In addition, bulky ligand catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference.

In one embodiment, the metal based catalyst compounds utilized in the catalyst composition of the invention are Group 15 bidentate or tridentate ligated transition metal compound having at least one substituted hydrocarbon group, the preferred Group 15 elements are nitrogen and/or phosphorous, most preferably nitrogen, and the preferred leaving group is a substituted alkyl group having greater than 6 carbon atoms, preferably the alkyl substituted with an aryl group.

The Group 15 containing metal catalyst compounds of the invention generally include a transition metal atom bound to at least one substituted hydrocarbon leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group, which may be a hydrocarbon group, preferably a hydrocarbon group having 1 to 20 carbon atoms, a heteroatom containing group, preferably silicon, germanium, tin, lead, or phosphorus. In this embodiment, it is further preferred that the Group 15 or 16 atom be bound to nothing or a hydrogen, a Group 14 atom containing group, a halogen, or a heteroatom containing group. Additionally in these embodiment, it is preferred that each of the two Group 15 atoms are also bound to a cyclic group that may optionally be bound to hydrogen, a halogen, a heteroatom or a hydrocarbyl group, or a heteroatom containing group.

Other bulky ligand catalysts are described as bis(hydroxy aromatic nitrogen ligands) in U.S. Pat. No. 5,852,146, which is incorporated herein by reference. Other bulky metallocene ligand catalysts containing one or more Group 15 atoms include those described in WO 98/46651, which is herein incorporated by reference. Still another bulky ligand catalysts include those multinuclear bulky ligand metallocene catalysts as described in WO 99/20665, which is incorporated herein by reference. Also included as bulky ligand catalysts include those complexes described in WO 00/47586, WO 00/47592, U.S. Pat. No. 6,143,682 (bimetallocyclic transition metal compounds), U.S. Pat. No. 6,090,961 (alkoxy titanium complex), and U.S. Pat. No. 6,114,555 (functionalized metallocene complexes).

It is also contemplated that in one embodiment, the bulky ligand catalysts of the invention described above include their structural or optical or enantiomeric isomers (meso and racemic isomers, for example see U.S. Pat. No. 5,852,143, incorporated herein by reference) and mixtures thereof.

It is further contemplated by the invention that other catalysts can be combined with the bulky ligand metallocene and other bulky ligand catalyst compounds of the invention. For example, see U.S. Pat. Nos. 4,937,299, 4,935,474, 5,281,679, 5,359,015, 5,470,811, and 5,719,241 all of which are herein fully incorporated herein reference. It is also contemplated that any one of the bulky ligand metallocene or other bulky ligand catalyst compounds of the invention have at least one fluoride or fluorine containing leaving group as described in U.S. application Ser. No. 09/191,916 filed Nov. 13, 1998.

In another embodiment of the invention one or more bulky ligand metallocene and other bulky ligand catalyst compounds or catalyst systems may be used in combination with one or more conventional-type catalyst compounds (including Phillips-type catalysts) or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Activator and Activation Methods for the Bulky Ligand Catalyst Compounds

The above described bulky ligand metallocene and other bulky ligand catalyst compounds are typically activated in various ways to yield catalyst compounds having a vacant coordination site that will coordinate, insert, and polymerize olefin(s).

For the purposes of this patent specification and appended claims, the term "activator" is defined to be any compound or component or method that can activate any of the bulky ligand metallocene and other bulky ligand catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral bulky ligand catalyst compound to a catalytically active bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, which would ionize the neutral bulky ligand catalyst compound.

In one embodiment, an activation method using ionizing ionic compounds not containing an active proton but capable of producing both a bulky ligand catalyst cation and a non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

Organoaluminum compounds useful as activators include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, now abandoned, all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand catalyst compounds with perchlorates, periodates and iodates including their hydrates. WO 98/30602 and WO 98/30603 incorporated by reference describe the use of lithium (2,2'-bisphenyl-ditrimethylsilicate). 4THF as an activator for a bulky ligand catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electrochemical oxidation, and the like are also contemplated as activating methods for the purposes of rendering the neutral bulky ligand catalyst compound or precursor to a bulky ligand cation capable of polymerizing olefins. Other activators or methods for activating a bulky ligand catalyst compound are described in for example, U.S. Pat. Nos. 5,849,852, 5,859,653 and 5,869,723 and WO 98/32775, WO 99/42467 (dioctadecylmethylammonium-bis(tris (pentafluorophenyl)borane)benzimidazolide), U.S. Pat. No. 6,130,302 ((polyfluoroaryl) fluoroanions of Al, Ga, In) and U.S. Pat. No. 6,130,357 (polyhalogenated monoheteroborane anion compositions), all of which are herein incorporated by reference.

It is also within the scope of this invention that the above described bulky ligand catalyst compounds can be combined with one or more of the catalyst compounds represented by formulas (I) through (V) with one or more activators or activation methods described above.

Support

The catalyst composition of the invention includes a support. The terms "support" includes any support material, preferably a porous support material, including inorganic or organic support materials. Non-limiting examples of inorganic support materials include inorganic oxides and inorganic chlorides. Other supports include resinous support materials such as polystyrene, functionalized or crosslinked organic supports, such as polystyrene divinyl benzene polyolefins or polymeric compounds, or any other organic or inorganic support material and the like, or mixtures thereof.

The preferred supports are inorganic oxides that include those Group 2, 3, 4, 5, 13 or 14 metal oxides. The preferred supports include silica, alumina, silica-alumina and mixtures thereof. Other useful supports include magnesia, titania, zirconia, magnesium chloride, montmorillonite (EP-B1 0 511 665), phyllosilicate, zeolites, talc, clays and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, which is herein incorporated by reference.

It is preferred that the support, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu m$. More preferably, the surface area of the support is in the range of from about 50 to about 500 $m^2/g$, pore volume of from about 0.5 to about 3.5 cc/g and average particle size of from about 10 to about 200 $\mu m$. Most preferably the surface area of the support is in the range is from about 100 to about 1000 $m^2/g$, pore volume from about 0.8 to about 5.0 cc/g and average particle size is from about 5 to about 100 $\mu m$. The average pore size of the support of the invention typically has pore size in the range of from 10 to 1000 Å, preferably 50 to about 500 Å, and most preferably 75 to about 450 Å.

Catalyst Composition

The above described catalyst compounds, activators and supports are combined in a liquid to form the catalyst composition of the invention. There a variety of methods for forming the catalyst composition of the invention. Any combination, order of addition, or the like is contemplated as a method of the invention.

In one embodiment, the catalyst compound, preferably the bulky ligand metallocene or other bulky ligand catalyst of the invention is contacted with an activator or cocatalyst in a liquid, prior to combining with the support.

In another embodiment, the activator or co-catalyst in a liquid are combined first with a support, and then the catalyst compound, preferably a bulky ligand catalyst compound is introduced, as a solid or in a solution.

In yet another embodiment, the support in a first liquid is contacted with the catalyst compound in a second liquid and the activator in a third liquid. In this embodiment, it is preferred that the first, second and third liquid are the same.

There are various types of liquids in which the catalyst composition or the components of the catalyst composition include. Non-limiting examples of liquids include any compatible solvent or other liquid capable of forming a solution or the like with the catalyst composition or the catalyst compound, activator or support. Non-limiting examples of suitable organic liquids include heptane, octane, decane, dodecane, kerosene, cyclopentane, cyclohexane, methylcyclopentane, and toluene, as well as mixtures thereof, preferably the organic liquid is anhydrous. In the most preferred embodiment the liquid is a cyclic aliphatic or aromatic hydrocarbon, most preferably toluene.

In a preferred method for forming the catalyst composition of the invention the catalyst compound, preferably a bulky ligand metallocene catalyst compound, an activator and a support are combined in an total amount of liquid, preferably toluene, such that the total volume solution in which the catalyst composition is formed is less than four times the pore volume of the support, more preferably less than three times, even more preferably less than two times; preferred ranges being from 1.1 times to 3.5 times range and most preferably in the 1.2 to 3 times range.

Procedures for measuring the total pore volume of support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The catalyst composition can range from the form of a slurry form to having a damp and clumpy appearance. The appearance of the catalyst composition depends on the organic liquid to solid ratio. Generally, a slurry is formed when two phases are observable, one of which contains all or most of the solid. At higher solid concentration, the solution volume is such that while two phases are not visible, the support is saturated and the support particles are firmly packed together. At even higher solid concentration, the catalyst composition can appear damp and clumpy like wet sand. In one embodiment, the solid to liquid ratio of the catalyst/support/activator/liquid or solvent is quantified by stating that the minimum solid to liquid ratio is defined by the liquid volume being at least 75% of the pore volume of the support, or at least 100%, or at least 150%, or at least 200%, most preferably at least 300% of the pore volume.

In an embodiment, the catalyst composition of the invention is formed by first treating a support, containing or in the presence of water, with an activator, preferably an organoaluminum compound, to form a supported activator, preferably a supported alumoxane, and second introducing a catalyst compound, preferably a bulky ligand metallocene catalyst compound, the combination being in a liquid, preferably toluene, then maintained for a period of time, from about 1 minute to 10 hours, preferably from about 1 minutes to about 5 hours, more preferably from about 1 minute to about 2 hours, prior to being introduced into a reactor for the polymerization of olefin(s).

In any of the methods for forming the catalyst composition of the invention, the combination of a liquid, a catalyst compound, an activator, and a support are combined for a period of time from 1 minute to about 12 hours, preferably from about 1 minute to about 10 hours, more preferably from about 1 minute to about 5 hours and most preferably from about 30 minutes to about 2 hours.

The temperature at which the catalyst composition is held for any one of the periods of times discussed above is from about 0° C. to 50° C., preferably from about 0° C. to 40° C., more preferably from about 0° C. to 30° C., most preferably from about 0° C. to 25° C. The preferred temperature is such that almost none or very little liquid, in which the catalyst composition is in, is evaporates.

In one embodiment of the invention the catalyst composition, as formed by the combination in a liquid of a support, a catalyst compound and an activator, is not dried or subjected to drying, heating or other evaporation procedures often used in traditional catalyst preparations. The catalyst composition of the invention as formed is not subjected to the addition of heat by any conventional means, including direct flame, steam, microwave, heated fluid, electric heating, or other heating means. Some heat generation is expected when the catalyst and activator are contacted with the support. The expected temperature rise depends on the liquid to solid ratio as discussed above. In the most preferred embodiment, the temperature rise is not more than 15° C., preferably the rise is not more than 10° C., more preferably not more than 5° C., even more preferably not more than 2° C., and most preferably not more than 0° C.

In another embodiment, and in combination or alone with any of the embodiments above, the use of vacuum to remove solvent is also substantially absent from the formation of the catalyst composition of the invention. This would include a pressure reduction below 0.6 atmospheres (atm), below 0.7 atm, below 0.8 atm, below 0.9 atm; inert gas purge, or combinations thereof, or other evaporative means, or anything that would substantially reduce the liquid volume or weight of the catalyst composition. The substantial absence of vacuum does not include the use of an inert gas to blanket the catalyst composition.

Where the catalyst compound is a bulky ligand metallocene catalyst compound, the mole ratio of the metal of the activator component to the metal of the bulky ligand catalyst compounds are in the range of between 0.3:1 to 1000:1, preferably 20:1 to 800:1, and most preferably 50:1 to 500:1. Where the activator is an ionizing activator such as those based on the anion tetrakis (pentafluorophenyl) boron, the mole ratio of the metal of the activator component to the metal component of the bulky ligand catalyst compound is preferably in the range of between 0.3:1 to 3:1.

In one embodiment of the invention, olefin(s), preferably olefin(s) having from 2 to 30 carbon atoms, or alpha-olefin (s), preferably ethylene or propylene or combinations thereof are prepolymerized in the presence of catalyst composition of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921, 825, 5,283,278 and 5,705,578 and European publication EP-B-0279 863 and PCT Publication WO 97/44371 all of which are herein fully incorporated by reference.

Polymerization Process

The catalyst compositions of the invention described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization, more preferably a slurry polymerization, of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to about 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are fully incorporated herein by reference.

A preferred process of the invention is where the process, preferably a slurry or gas phase process is operated in the presence of a bulky ligand metallocene or bulky ligand catalyst composition of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using the catalyst composition of the invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and coextrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Example 1

A 0.15 ml of a 5 µmol/ml DMSP (dimethylsilyl bis (n-propylcyclopentadienyl) zirconium dichloride) solution, 0.40 ml of a 7 wt % Al MMAO (modified methyl alumoxane available from Akzo, La.), and 1.5 ml toluene are mixed together. The resulting mixture is added to 450 mg of silica gel (Davison 948, average particle size=55 µm, dried at 600° C. available from W.R. Grace, Davison Division, Baltimore, Md.) contained in a catalyst delivery tube. The resulting mixture is held at ambient temperature for 20 minutes.

A 2 liter autoclave previously flushed with nitrogen and containing 0.055 ml of tri-isobutyl aluminum (TIBAL) in heptane (0.0933 mmol Al/cm$^3$) and 800 ml of isobutane is heated to 85° C. The reactor is pressurized with ethylene to a total reactor pressure of around 340 psig (2344 kPa). The catalyst mixture is pushed into the reactor by isobutane pressure. The polymerization is allowed to proceed at 85° C. for 40 minutes. After the polymerization, the isobutane and unreacted ethylene is vented and the polymer slurry is transferred into an evaporation dish. The interior of the autoclave and the agitator were very clean. Particle morphology was good. 155 g of polymer was obtained yielding a catalyst activity of 36,495 gm PE/mmol Zr/hr/atm.

Example 2

A 0.75 µmol of a bis (n-propylcyclopentadienyl) zirconium dichloride solution, 0.75 mmol MMAO (as above), and toluene are mixed together. The resulting mixture is added to 450 mg of silica gel (Davison 948, average particle size=55 µm, dried at 600° C.) (as above) contained in a catalyst delivery tube. The resulting mixture is held at ambient temperature for 20 minutes. Polymerization of ethylene is performed as in Example 1. 92 g of polymer was obtained yielding a catalyst activity of 21,638 gm PE/mmol Zr/hr/atm.

Example 3

A 0.19 µmol of a DMSP solution, 1.31 µmol of a [(2,4,6-Me$_3$C$_6$H$_2$NCH$_2$CH$_2$)$_2$—NH]ZrBz$_2$ solution (available from Albemarle, Baton Rouge, La.), 0.5 mmol MMAO (as above), and toluene are mixed together. The resulting mixture is added to 450 mg of silica gel (Davison 948, average particle size=55 µm, dried at 600° C.) (as above) contained in a catalyst delivery tube. The resulting mixture is held at ambient temperature for 20 minutes. Polymerization of ethylene is performed as in Example 1. 50 g of polymer is obtained yielding a catalyst activity of 5,880 gm PE/mmol Zr/hr/atm. The polymer had a bimodal molecular weight distribution with a molecular weight distribution of 7.52 and a melt index ratio of 417.

Example 4

A 0.75 µmol of a bis (n-propylcyclopentadienyl) zirconium dichloride solution and toluene are mixed together. The resulting mixture is added to 42.2 mg of supported activator, specifically supported methylalumoxane (SMAO) (24 wt % Al) (available from (Crompton Knowles, previously Witco) contained in a catalyst delivery tube. The Al/Zr ratio is 500. The resulting mixture is held at ambient temperature for 20 minutes. Polymerization of ethylene is performed as in Example 1. 132 g of polymer is obtained yielding a catalyst activity of 31,046 gm PE/mmol Zr/hr/atm.

Comparative Example 1

A 50 mg of a supported bis (n-propylcyclopentadienyl) zirconium dichloride on silica (Davison 948, average particle size=55 µm, dried at 600° C.) prepared using the standard support method is polymerized. The catalyst compound is supported by preparing a solution of the catalyst compound and a methylalumoxane in toluene. The solution is held for approximately one hour. This solution is then deposited on a silica support. The resulting catalyst slurry is held for several hours under vacuum at approximately 70° C. The drying step involved vacuum removal or nitrogen purge of the solvent at elevated temperatures. Polymerization of ethylene is performed as in Example 1 with the exception that 0.03 ml of triethylaluminum (TEAL, 1.6 mmol Al/cm$^3$) is used instead of TIBAL. The catalyst activity was 6,800 gm PE/mmol Zr/hr/atm.

While the present invention has been described and illustrated by reference to particular embodiments thereof, it will be appreciated by those of ordinary skill in the art that the invention lends itself to variations not necessarily illustrated herein. For example it is possible to utilize a traditionally supported catalyst in combination with the catalyst composition of the present invention. It is also contemplated that the catalyst composition of the invention is used in a slurry polymerization reactor that is connected in series to another slurry or gas phase reactor system. Reference should be made solely to the appended claims for purposes of determining the true scope of the present invention.

We claim:

1. A process for polymerizing ethylene alone, or in combination with one or more alpha-olefin(s) in the presence of a catalyst composition in a reactor, the catalyst composition is in a slurry of a support, having a pore volume, a bulky ligand metallocene catalyst compound and an activator, the slurry comprising a solids to liquid ratio wherein the liquid has a volume of less than four times the pore volume of the support; wherein the slurry is mixed for a period of time from about 1 minute to 5 hours prior to its use.

2. The process of claim 1 wherein the reactor is a slurry reactor.

3. The process of claim 1 wherein the period of time is from 1 minute to 2 hours.

4. The process of claim 1 wherein the support and the activator are combined to form a supported activator.

5. The process of claim 1 wherein the activator is an alumoxane.

6. A slurry process for polymerizing monomer(s) in a reactor in the presence of a catalyst composition to form a polymer product, said process comprising the steps of:

(a) introducing one or more monomer(s) to the reactor, the reactor comprising a liquid polymerization diluent medium and other volatile components;

(b) introducing to the reactor the catalyst composition within 1 minute to 5 hours after combining in a liquid, a catalyst compound, an activator and a support, wherein the catalyst composition is used as is without evaporating or dehydrating any of the liquid;

(c) withdrawing the diluent and other volatile components, intermittently or continuously, from the reactor; and (d) separating the volatile components from the polymer and recycling, optionally after a distillation, the resulting medium to the reactor with fresh monomer(s).

7. The process of claim 6 wherein the time for introducing the catalyst composition to the reactor is within 1 minute to 2 hours.

8. The process of claim 6 wherein the catalyst compound is a bulky ligand metallocene compound.

9. The process of claim 6 wherein the support and the activator are combined prior to combining with the catalyst compound.

10. The process of claim 6 wherein the liquid is an aromatic hydrocarbon.

11. The process of claim 6 wherein the total volume of liquid present in the catalyst composition is greater than 75 percent to less than 400 percent of the total pore volume of the support.

12. The process of claim 1 wherein the reactor is a gas phase reactor.

13. The process of claim 1, wherein the liquid is an aromatic hydrocarbon.

14. The process of claim 6, wherein the catalyst compound is a Group 15 bicentate or tridentate catalyst compound.

* * * * *